United States Patent
Cheng et al.

(10) Patent No.: US 6,421,656 B1
(45) Date of Patent: *Jul. 16, 2002

(54) METHOD AND APPARATUS FOR CREATING STRUCTURE INDEXES FOR A DATA BASE EXTENDER

(75) Inventors: Josephine M. Cheng; Jyh-Herng Chow; Jian Xu, all of San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/324,826

(22) Filed: Jun. 2, 1999

Related U.S. Application Data

(60) Provisional application No. 60/103,501, filed on Oct. 8, 1998.

(51) Int. Cl.[7] .................. G06F 17/30; G06F 3/00; G06F 13/00
(52) U.S. Cl. .............. 707/2; 707/3; 707/4; 709/236
(58) Field of Search .................. 709/203, 217, 709/236; 707/6, 10, 40, 513, 530, 522, 4, 2, 3, 514

(56) References Cited

U.S. PATENT DOCUMENTS

| | | | | |
|---|---|---|---|---|
| 5,822,539 A | * | 10/1998 | Van Hoff | ............... 709/236 |
| 5,826,025 A | * | 10/1998 | Gramlich | ............... 709/217 |
| 6,094,649 A | * | 7/2000 | Bowen et al. | ............... 707/3 |
| 6,105,044 A | * | 8/2000 | DeRose et al. | ............... 707/514 |
| 6,240,407 B1 | * | 5/2001 | Chang et al. | ............... 702/2 |

* cited by examiner

Primary Examiner—Safet Metjahic
Assistant Examiner—Te Y Chen
(74) Attorney, Agent, or Firm—Sughrue Mion, PLLC

(57) ABSTRACT

A method and apparatus using an extender for a computer-implemented relational database system is disclosed for storing, querying, and retrieving structured documents. The extender provides a new abstract data type and includes a plurality of user defined functions for storing, querying, and retrieving structured documents internally, as character-based large objects (CLOB), or externally, in flat files or URLs, for example. The extender has "conditional select" functionality, "conditional select" functionality is based on user defined functions residing within the extender being applied to a projection in a structured query in the database system. The extender also has a set of user defined functions for creating one or more indexes for structured documents stored in the relational database system using already created B+ tree index structures implemented in the database system to support the indexes. The method includes a tag counting system for indexing structured documents and for implementing the structure indexes within the relational database.

33 Claims, 13 Drawing Sheets

METHOD AND APPARATUS FOR CREATING STRUCTURE INDEXES FOR A DATA BASE EXTENDER

CROSS REFERENCE TO PROVISIONAL APPLICATION

This application claims priority from U.S. Provisional Application No. 60/103,501, entitled, "XML Extender And Index Structured Documents," filed on Oct. 08, 1998, by Chang et al., which is incorporated by reference herein.

CROSS-REFERENCE TO RELATED APPLICATIONS

The present application is related to the following applications, all filed on the same date as the present application, and commonly assigned with the present application.

1. application Ser. No. 09/325,661 entitled "DATABASE EXTENDER FOR STORING, QUERYING AND RETRIEVING STRUCTURED DOCUMENTS" and naming Daniel T. CHANG, Josephine M. CHENG, Jyh-Herng CHOW and Jian XU as inventors;
2. application Ser. No. 09/324,827 entitled "METHOD AND APPARATUS FOR QUERYING STRUCTURED DOCUMENTS USING A DATABASE EXTENDER" and naming Josephine M. CHENG, Jyh-Herng CHOW and Jian XU as inventors; and
3. application Ser. No. 09/324,499 entitled "METHOD AND APPARATUS FOR INDEXING STRUCTURED DOCUMENTS WITH RICH DATA TYPES" and naming Josephine M. CHENG, Jyh-Herng CHOW, Gene Y. C. FUH and Jian XU as inventors.

BACKGROUND OF THE INVENTION

1. Field of the Invention

The present invention relates in general to computer-implemented database systems, and, in particular, to an extender for a computer-implemented relational database system for storing, querying, and retrieving structured documents. The present invention further relates to other features of an extender for a computer-implemented relational database system, including indexing of structured documents with general and rich data types, querying structured documents using a novel conditional select function; and creating structure indexes using a novel tag counting system.

2. Description of the Related Art

HyperText Markup Language (HTML) has been the standard format for delivering information on the World Wide Web (WWW). HTML documents are very well suited for Web browsing, as opposed to automated information processing, which can be difficult because of the few semantics associated with the documents. Just as in a programming language, program semantics are defined by a standardized set of keywords. HTML has a limited set of keywords (i.e., tags) and they are mainly for presentation purposes, not for semantics associated with document contents. For example, without human understanding or a sophisticated program, it is difficult to know what a number "1991" means in an HTML document; it could be a year, a quantity, or a word with some other meaning.

In response to growing concerns about HTML's versatility, Extensible Markup Language (XML), which is a subset of Standard Generalized Markup Language (SGML), has been proposed to the World Wide Web Consortium (W3C) as the next standard format. XML is a meta language, allowing a user to design a customized markup language for many classes of structured documents. XML supports user-defined tags for better description of nested document structures and associated semantics, and encourages separation of document contents from browser presentation. For interoperability, domain-specific tags, called vocabulary, can be standardized, so that applications in that particular domain understand the meaning of the tags. Various vocabularies for different domains have been proposed in the SGML community, such as Electronic Data Interchange (EDI) for banking exchange, Standard Music Description Language (SMDL) for music, or Chemical Markup Language (CML) for chemistry. Recently, vocabularies have been proposed in the XML community, for example the Channel Definition Format (CDF) for channels. XML removes the dependence on a single, inflexible document type (i.e. HTML), while retaining the complexity of full SGML.

Structured documents are documents which have nested structures. XML documents are structured documents. The challenge has been to store, search, and retrieve these documents using the existing business database systems. Assuming a need to manage an abundance of XML documents, in particular within intranets (within a business) and extranets (between businesses), where documents are more likely to be regularly structured, there is clearly a need for a product that understands document structures and allows a user to store, search using structure queries, and retrieve XML documents within the database system.

Databases are computerized information storage and retrieval systems. A Relational Database Management System (RDBMS) is a database management system (DBMS) which uses relational techniques for storing and retrieving data. Relational databases are organized into tables, which consist of rows and columns of data. The rows are formally called tuples. A database will typically have many tables and each table will typically have multiple tuples and multiple columns. The tables are typically stored on direct access storage devices (DASD), such as magnetic or optical disk drives for semi-permanent storage.

Among existing products providing storage and retrieval capabilities are those distributed by Oracles® Corporation and POET Software Corporation. The Oracle 8i XML support system stores each element of an XML document in a different table within the database system. The software product marketed by POET Software Corporation breaks down XML documents into objects and stores them in an object-oriented database added to the existing database that a business uses. Both products create a burden on the management and maintenance of the database system. An application is needed that would efficiently use the existing resources of a business to store and retrieve XML documents.

With respect to search capabilities, current search engines either flatten out the structure of a document (i.e., remove the nested structures), or have limited, predefined structures (such as paragraphs and sentences, according to some predefined punctuation marks). Therefore, there also is a need for an application capable of evaluating general ad hoc structure queries.

To add even richer semantics to XML documents, proposals to W3C have suggested adding of data types into XML documents and associating these data types with XML elements and attributes. This implementation could allow users to ask "range queries" requiring numeric value comparisons among elements in an XML document. These queries normally require B+ tree index structures residing in databases. However, processing of such queries is certainly beyond the capabilities of most information retrieval systems and search engines based on inverted indices and providing support to B+ tree index structures in these systems is very expensive. Therefore, there is a further need for an application that uses existing B+ tree index structures, already implemented in the database system to support indexes for structured documents with rich data types.

Several approaches have been adopted to solve this problem and to perform searches on structured documents with rich data types. For example, an alternative has been proposed to implement the B+ tree index structures inside the text search engine and then to perform the search. However, this approach is very expensive to implement. Another approach involves the creation of actual tables having columns storing attributes of XML documents. An index can be created on the columns and this index could support searches. This approach wastes space and cannot efficiently maintain the extra table. In yet another approach, the user creates an additional table, called a summary table, storing all attributes existent in the XML documents. Although the problem of maintaining the table is somewhat solved because the database manager usually maintains the summary table, the waste of space is still burdensome.

SUMMARY OF THE INVENTION

To overcome the limitations in the prior art described above, and to solve various problems that will become apparent upon reading and understanding of the present specification, it is one object of the present invention to provide a method, apparatus and article of manufacture for computer-implemented storage, searching, and retrieval of structured documents in a relational database system.

The present invention is directed to relational extenders for a computer-implemented relational database system. These relational extenders are entities created to help relational database users handle complex data types. Relational extenders define and implement new complex data types, storing the attributes, structure, and behavior of the data types in a column of a relational database table. The complex data types stored in relational databases support new applications to be run and/or extend existing business applications. Within the relational database system, these data types need to be manipulated through the standard Structured Query Language (SQL). As a result, relational extenders provide good management solutions for handling any type of data.

In accordance with the present invention, an XML extender for a computer-implemented relational database system is disclosed for storing, querying, and retrieving structured documents. Generally, relational extenders define and implement complex data types and extend the tables within the relational database with the new data types. The XML extender provides a new Abstract Data Type (ADT) DB2XML, which can be specified as a column data type, and includes several User Defined Functions (UDFs) for storing, searching, and retrieving XML documents internally, as DB2® Character Based Large Objects (CLOB), or externally, in flat files or Uniform Resource Locators (URLs), for example.

Another object of the present invention is to provide an application for storing XML documents in existent or newly created columns of a relational database table or in external files.

Yet another object of the invention is to provide an application for searching XML documents using SQL structure queries.

Still another object of the invention is to use such an application for searching the content and attribute values of elements of an XML document based on a specified sequence of such elements.

A further object of the invention is to use such an application for searching XML documents stored in external files or URLs as if they were stored in DB2®.

Yet another object of the invention is to use such an application for retrieving XML documents by integrating structural search capabilities into DB2®'s SELECT queries.

Yet another object of the invention is to provide an application for creating and supporting an index for structured documents with rich data types using index structures residing in the DB2® database.

A further object of the invention is to provide an application for creating and supporting structure indexes for the XML extender using a tag counting system for counting and storing occurrences of elements of an XML document.

BRIEF DESCRIPTION OF THE DRAWINGS

The above objects and advantages of the present invention will become more apparent by describing in detail preferred embodiments thereof with reference to the attached drawings in which like reference numbers represent corresponding parts throughout.

DETAILED DESCRIPTION OF THE PREFERRED EMBODIMENT

Figure 1:
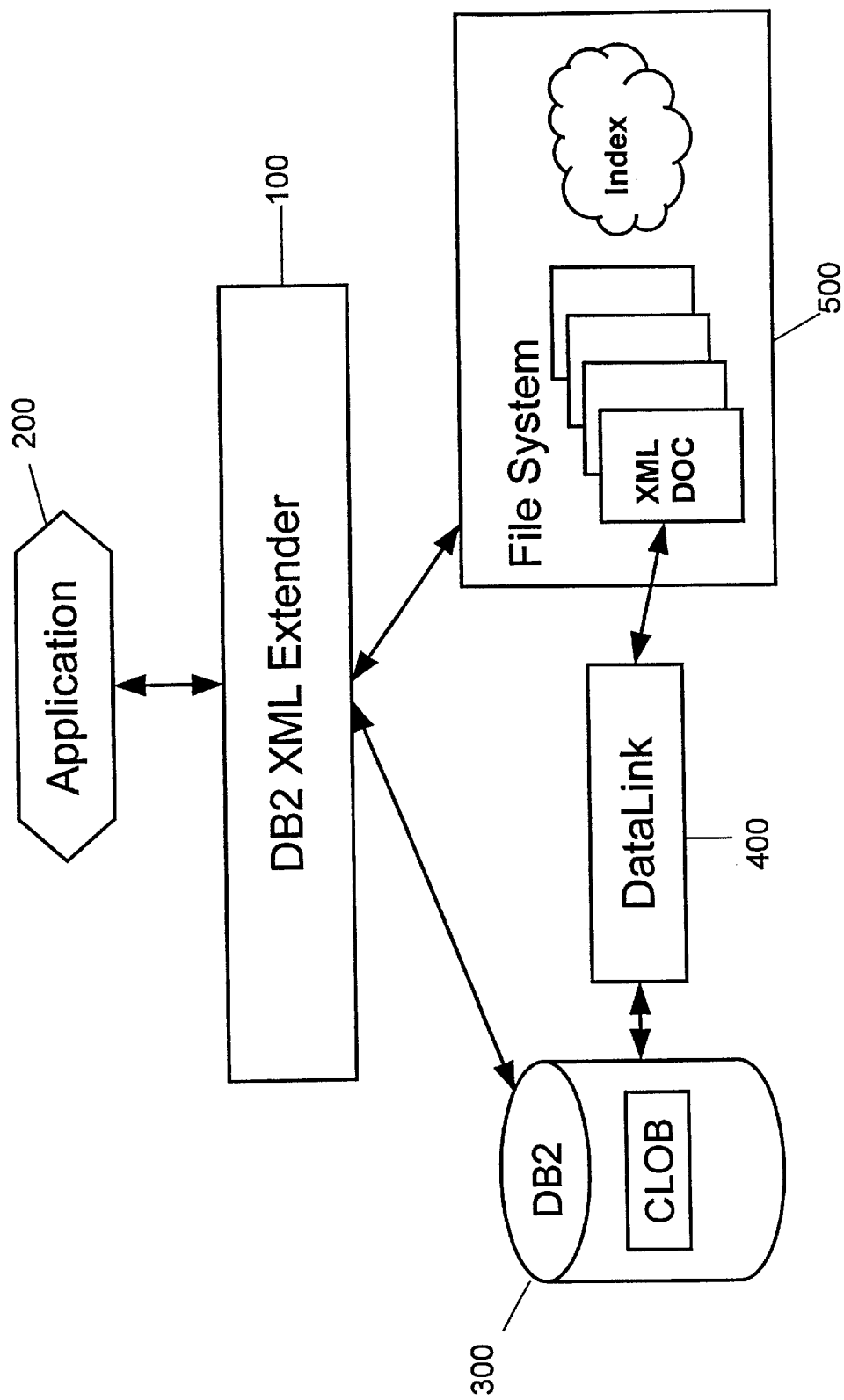
FIG. 1 is a block diagram of the computer-implemented database system for use in accordance with the present invention.

In the following description of the preferred embodiment, reference is made to the accompanying drawings, which form a part hereof, and which show by way of illustration a specific embodiment of the invention. It is to be understood by those of ordinary skill in this technological field that other embodiments may be utilized, and structural changes may be made without departing from the scope of the present invention. For example, the following discussion is presented in the context of a DB2® version 6 database environment, available from IBM® Corporation. It should be understood that the present invention is not limited to DB2® version 6 and may be implemented with other relational database systems.

The following discussion relies on XML documents and their document type definition elements. An example of an XML document is:

```
<?XML version="1.0" encoding="UTF-8" ?>
<!---------------------------------------->
<!--------------book-------------------->
<!------------book.xml-------------------->
<!---------------------------------------->
<!DOCTYPE book SYSTEM "book.dtd">
<book>
<!---------------------------------------->
<author> Sriram Srinivasan </author>
<title> Advanced Perl Programming </title>
<publisher> O'Reilly </publisher>
<date> August, 1997 </date>
<edition> First </edition>
<abstract> This is a very good Perl book. </abstract>
<!---------------------------------------->
<toc>
<!---------------------------------------->
<chapter id="1" total="8"> Data Reference and Anonymous Storage
<section> Referring to Existing Variables </section>
<section>Using References </section>
<section> Nested Data Structure </section>
<section> Querying a Reference </section>
</chapter>
<!---------------------------------------->
<chapter id="2"total="6">Implementing Complex Data Structure
<section> User-Defined Structures </section>
<section> Example: Matrices </section>
<section> Professors, Students Course </section>
</chapter>
<!---------------------------------------->
<appendix>
<section>id="A"> The Widget Reference </section?
<section>id="B"> Syntax Summary </section>
</appendix>
<!---------------------------------------->
</toc>
<!---------------------------------------->
</book>
```

The following document type definition elements are used in the examples discussed in this application:

```
<?XML version="1.0" encoding="UTF-8" ?>
<!---------------------------------------->
<!--------------Resume-------------------->
<!------------book.dtd-------------------->
<!---------------------------------------->
<!ELEMENT book(author,title,publisher,date,edition,
   abstract,toc)>
<!---------------------------------------->
<!ELEMENT author (#PCDATA) >
<!ELEMENT title (#PCDATA) >
<!ELEMENT publisher (#PCDATA) >
<!ELEMENT date (#PCDATA) >
<!ELEMENT edition(#PCDATA) >
<!ELEMENT author (#PCDATA) >
<!ELEMENT abstract (#PCDATA) >
<!ELEMENT toc (chapter+, appendix*) >
<!---------------------------------------->
<!ELEMENT chapter (#PCDATA, section+) >
<!ATTLIST chapter
  id CDATA #REQUIRED
  total CDATA #REQUIRED>
<!---------------------------------------->
<!ELEMENT appendix (section+))>
<!ATTLIST appendix
  id CDATA #REQUIRED
  total CDATA #REQUIRED>
<!---------------------------------------->
<!ELEMENT section (#PCDATA) >
<!ATTLIST section
  id CDATA #IMPLIED>
```

Figure 7:
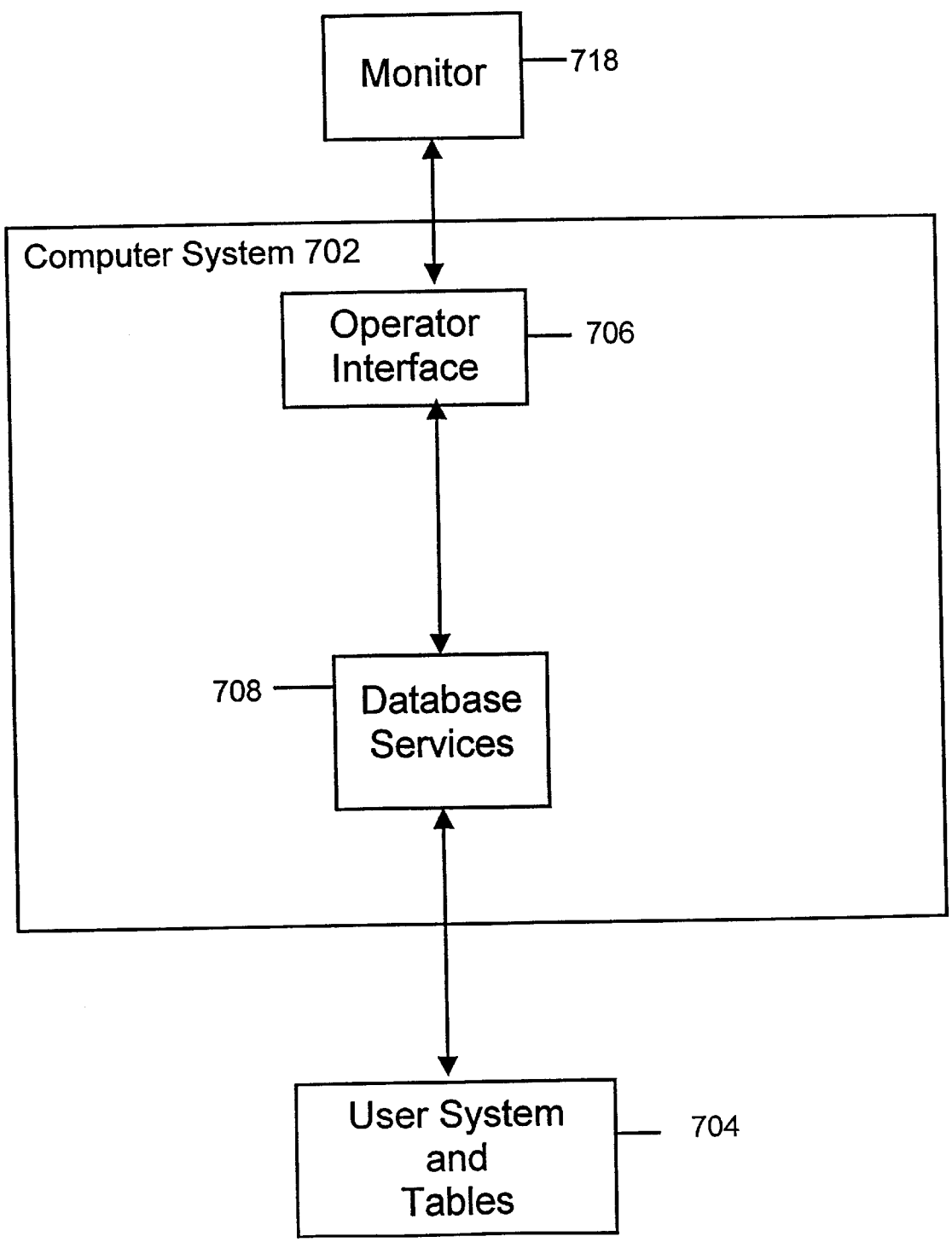
FIG. 7 is an exemplary computer hardware environment for use in accordance with the present invention.

Generally, relational extenders for computer-implemented relational database systems define and implement complex data types and extend relational data tables with these data types. FIG. 7 illustrates an exemplary computer hardware environment for use with the present invention. In FIG. 7, a computer system 702 has one or more processors connected to one or more data storage devices 704 that store one or more relational databases. Each data storage device 704 may be any of a plurality of types, all of which are well known in the art, including but not limited to magnetic, optical, magneto-optical, or semiconductor memory.

Operators of the computer system 702 may use a standard operator interface 706, such as IMS/DB/DC®, CICS®, TSO®, OS/390®, ODBC® or other appropriate interface, to transmit electrical signals to and from the computer system 702, representing commands for performing various search and retrieval functions, termed queries, against the databases. In the present invention, these queries employ Structured Query Language (SQL), and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM Corporation (IBM) for the MVS® or OS/390® operating systems and the DB2 Universal Database (UDB) offered by IBM for workstations. Those skilled in the art will recognize, however, that the present invention has application to any RDBMS software, whether or not the RDBMS software uses SQL.

At the center of the DB2® system is the Database Services module 708, which retrieves or receives the SQL statements and then derives or synthesizes instructions from the SQL statements for execution by the computer system 702. Generally, the RDBMS software and the instructions are all tangibly embodied in a computer-readable medium, e.g. one or more of the data storage devices 704. Moreover, the RDBMS software and the instructions derived therefrom are all comprised of instructions which, when read and executed by the computer system 702, cause the computer system 702 to perform the steps necessary to implement and/or use the present invention. Under control of an operating system, the RDBMS software and the instructions derived therefrom, may be loaded from the data storage devices 704 into a memory of the computer system 702 for use during actual operations.

Those skilled in the art will recognize that the exemplary environment illustrated in FIG. 7 is not intended to limit the present invention. Indeed, those skilled in the art will recognize that other alternative hardware environments may be used without departing from the scope of the present invention.

The present invention will now be described in further detail. FIG. 1 illustrates a computer-implemented database system for use in accordance with the present invention. In the preferred embodiment of the present invention, the computer-implemented database system comprises the DB2® 300 database, an external file system 500, an XML extender 100 connected to the DB2® 300 database and the file system 500, and a data link 400 connecting the DB2® 300 and the external file system 500. The data link 400 is part of the DataLink technology introduced by IBM®. A user application 200 is connected to the extender 100 for providing efficient user access to the database system.

Those skilled in the art will recognize that the database system illustrated in FIG. 1 is not intended to limit the present invention. Indeed, other alternative hardware and software environments may be used without departing from the scope of the present invention.

Figure 2:
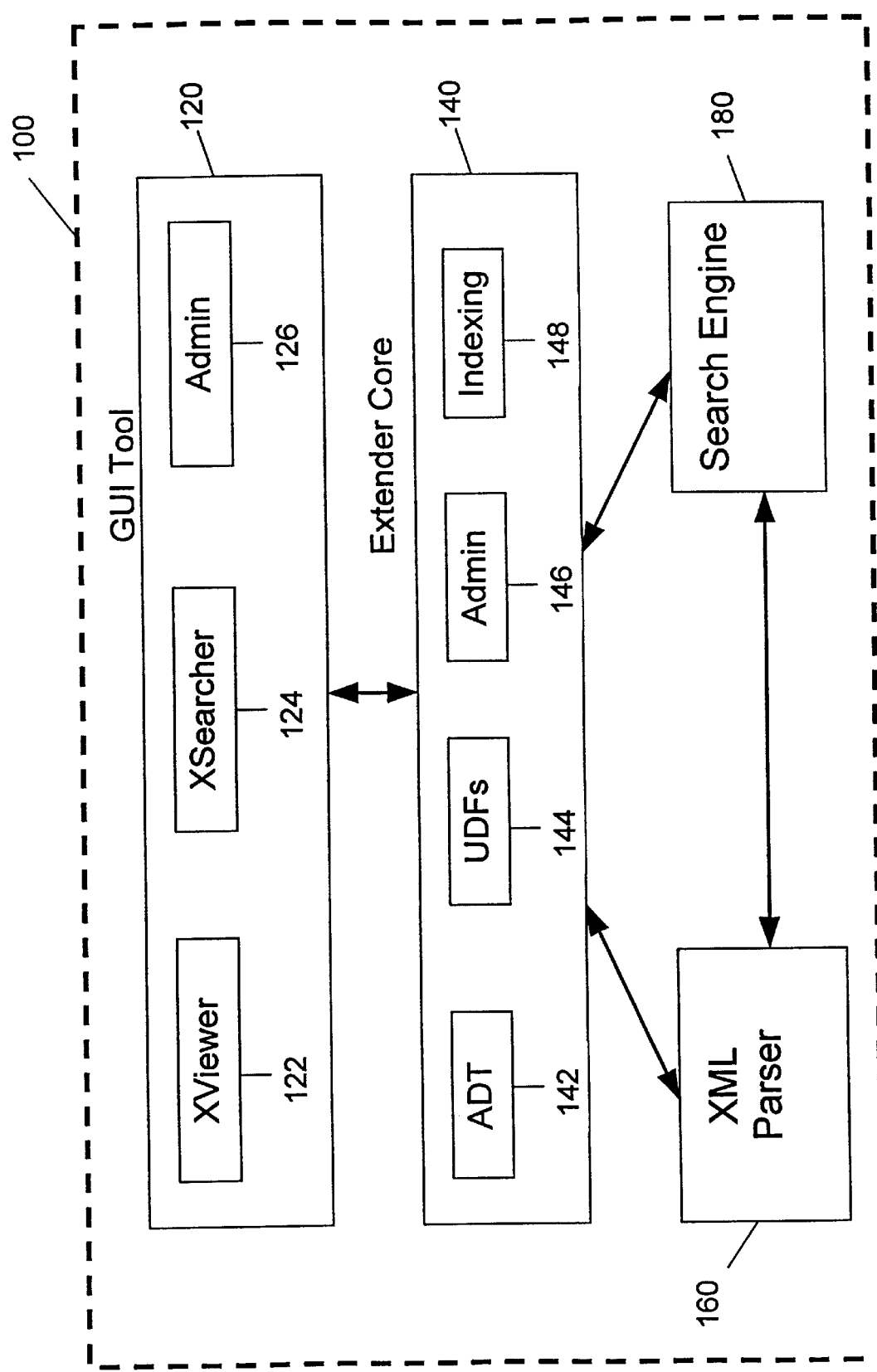
FIG. 2 is a block diagram of the XML extender of the present invention.

A preferred embodiment of the XML extender 100 will now be described in further detail. As illustrated in FIG. 2, the extender 100 comprises a GUI tool 120, an extender core 140, an XML parser 160, and a search engine 180. The GUI tool 120 is a tool to generate a standard SQL application program interface (API) allowing the user to access and manipulate data. The GUI tool 120 further comprises standard functions for facilitating searches (Xsearcher) 124, for accessing an XML document after a search is completed, and retrieving search results (Xviewer) 122, as well as an administration tool 126. The extender core 140 includes an abstract data type (ADT) 142, user defined functions (UDFs) 144, an administration tool 146, and an indexing tool 148.

The ADT 142 is a relational facility introduced by DB2® version 6 allowing the user to define new and distinct data types and subtypes to a database engine. Subsequently, the database engine ensures that an application uses data of a specific data type only when the user requires and expects such an action. In order to provide the flexibility of user defined types and subtypes, the XML extender 100 creates an ADT 142 called DB2XML for storing and retrieving XML documents. The DB2XML ADT 142 is a structured data type with its own attributes, which are used to store data and metadata of XML documents. With the DB2® version 6 ADT feature, a set of methods called accessor methods is automatically generated when DB2XML ADT 142 is created. The implementation of the ADT 142 will be discussed below within the overall operation of the XML extender 100.

The UDFs 144 are built-in relational facilities introduced by DB2® version 6 allowing the user to define new functions for storage, search, and retrieval of XML documents. Through the signature of its parameter list, a UDF 144 may be associated with a standard data type, such as the DB2XML ADT 142. The UDFs 144 convert XML files into a storage format with predefined attribute values, storing XML documents internally within the DB2® database 300 or externally within the file system 500. After integrating XML documents into the database system, the UDFs 144 may be included in SQL statements to describe properties of XML documents via DB2XML attribute values, to search for element content or XML attribute values by specifying the structural path, or to search for XML documents by a structural search on both path and content. The implementation of the UDFs 144 will be discussed below within the overall operation of the XML extender 100.

The XML extender 100 provides a command of xmladm as the administration tool 146. With help from the xmladm command, the user manages the operation of the extender 100, enabling/disabling a variety of features, which will be discussed below within the overall operation of the XML extender 100.

The indexing mechanism 148 provides indexing of the XML documents stored within the DB2® database 300 or in the external file system 500. The XML extender 100 performs key transformations on indices provided by the DB2® database 300, creating an index that supports structural queries. The indexing methods provided by the indexing mechanism 148 will be explained below within the overall operation of the XML extender 100.

Figure 4:
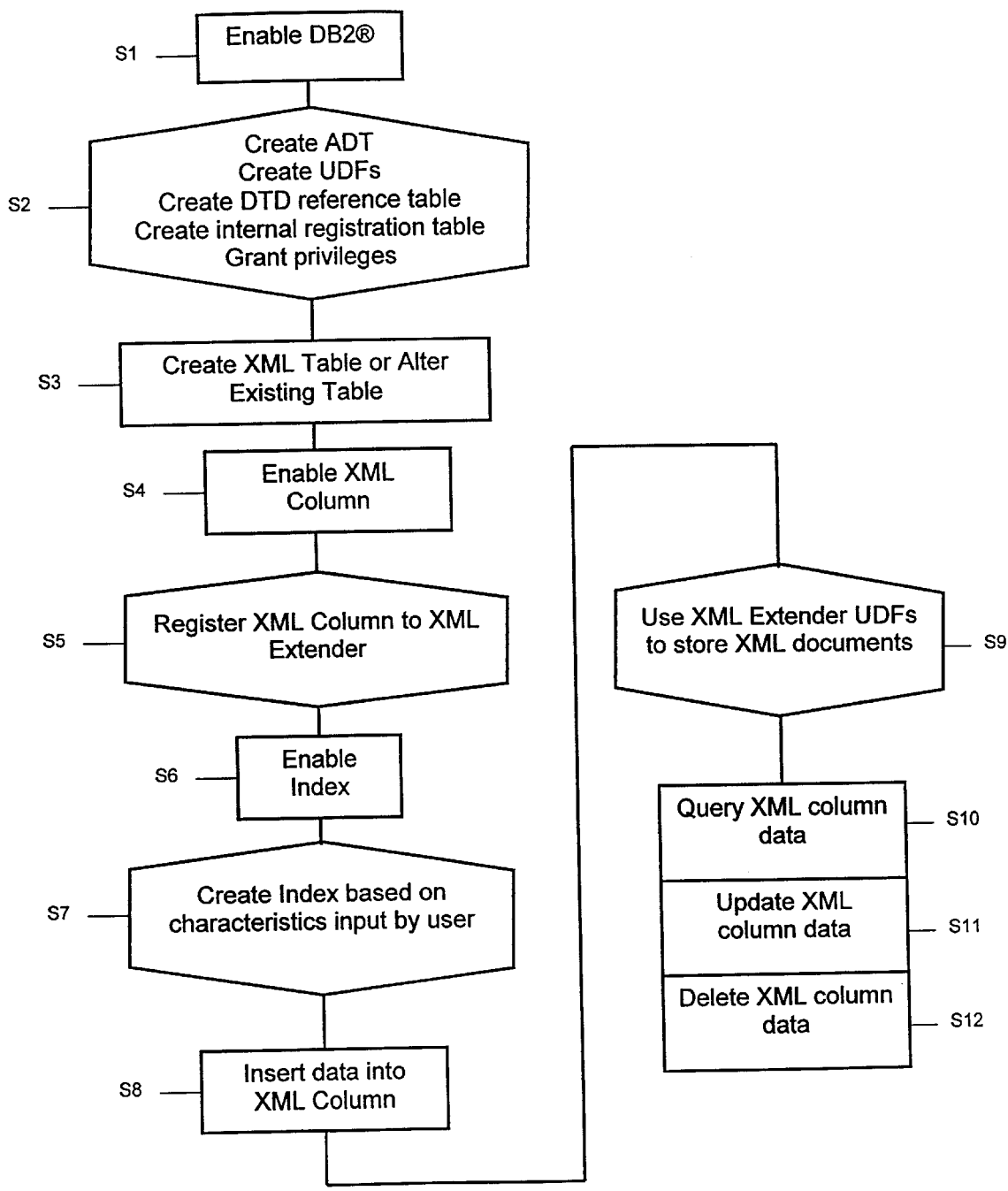
FIG. 4 is a flow diagram showing the steps necessary for storing, querying, and retrieving structured documents in accordance with the present invention.

The operation of the XML extender 100 will now be described in further detail with reference to FIG. 4. FIG. 4 is a flowchart, which conceptually illustrates the steps carried out by the components depicted in FIG. 2 to store XML documents in an interactive environment according to the present invention and to further perform operations on the stored XML documents. In FIG. 4, the square blocks represent actions performed by the user, while the hexagonal blocks depict internal actions taken by the XML extender 100. In step S1, the DB2® database is enabled, while in step S2, an abstract data type ADT, user defined functions UDFs, a DTD reference table and an internal registration table are created and user privileges are granted. In step S3, an XML table is created or an existing table is altered. In step S4, an XML column in the table is enabled, and, as a result, in step S5, the XML column is registered to the internal registration table of the XML extender. In step S6, an index for future searching is enabled, resulting in step S7, in the index being created based on characteristics input by the user. In step S8, data is inserted into the XML column, while in step S9, UDFs are used to process and store XML documents. Finally, in steps S10, S11, and S12, data stored in the XML column is respectively queried, updated, and deleted. Each step of the present invention will now be described in further detail.

The present invention takes place in a context where, initially, the DB2® database must be XML enabled to work with an XML extender.

A. Enablement of the DB2® database

The XML extender is not available until the database is enabled. The XML extender provides a command of xmladm as the administration tool. This command enables/disables the XML extender to work with the DB2® database, enables/disables any DB2XML columns, and enables/disables any index on the DB2XML columns. The database can be enabled with the enable_db option of the xmladm administration tool. The syntax of the option to be entered by the user is xmladm enable_db dbname where dbname is the name of the database to be enabled. The enable_db option triggers several internal actions by the database system, actions shown as step S2 in FIG. 4.

1. Creation of the Abstract Data Type DB2XML

As illustrated in FIG. 4, one internal action executed when the database is XML enabled is the creation of the abstract data type DB2XML. The DB2XML data type is created with the create adt command as follows:

```
create adt DB2XML (
    DTDid     int, /* you need to get DTDid from XML_DTD_REF*/
    StType    int,
    fileName  varchar (256),
    content   clob (10k),
    size      int,
    creator   varchar (20))
```

In this routine, DTDid is an integer value identifying a document type definition element (DTD) of an XML document. This value resides in a DTD reference table also created as a result of the enabling of the DB2® database. The stType attribute is a storage type as a constant, specifying the way the XML document must be stored in DB2®. The storage type has the following values: XML_FILE for storing an XML object as external file; XML_URL for storing an XML object as external URL; and XML_CLOB for reading an XML object from a file and storing it as CLOB in DB2®. The fileName attribute represents the name of an external file or URL of the XML document if stType is XML_FILE or XML_URL, and is null otherwise. The content attribute is a character-based large object (CLOB) containing the XML document if stType is XML_CLOB, and is null otherwise. The size attribute represents the size of the XML document in term of bytes. The creator attribute represents the user ID.

Together with the creation of the abstract data type DB2XML, a set of accessor methods is automatically generated when DB2XML is created. The system-generated accessor methods for DB2XML include observers and mutators. The instruction for the observers is DB2XML..ATTRNAME ( ) RETURNS ATTRTYPE, wherein ATTRNAME and ATTRTYPE are the name and type of each attribute described above. The instruction for the mutators is DB2XML..ATTRNAME (ATTRTYPE) RETURNS DBTXML, wherein ATTRNAME and ATTRTYPE are the name and type of each attribute described above.

Subsequent to the creation of DB2XML, the XML extender overwrites a system-generated constructor and redefines the constructor as follows:

```
DB2XML( DTDid    int,
        stType   int,
        fileName varchar(256),
        content  clob(10k),
        size     int,
        creator  varchar (20))
RETURNS DB2XML
```

This redefined constructor can be used to insert and update data together with other UDFs provided by the XML extender.

The DB2XML as an abstract data type can be subtyped, i.e. a user can customize the data type of the XML document. For example, the user can add additional attributes to the data type with the following instructions:

```
EXEC SQL Create adt XML_CDF under DB2XML AS
         (channel  varchar(256),
          title    varchar(1000))
```

In this example, XML_CDF is a subtype of DB2XML and has additional attributes, channel and title.

2. Creation of User Defined Functions

Another internal action executed when the database is XML enabled is the creation of user defined functions. The XML extender provides a number of functions for storage, search, and retrieval of XML documents. It is to be understood that the present invention is not intended to be limited to functions solely provided by the XML extender, and that other functions, provided by the user for example, may be utilized.

Storing functions are used to store XML documents into the DB2® database. When the XML parser 160 parses the XML document, it finds whether the XML document possesses a DTD. Then, the XML extender searches the XML_DTD_REF reference table to see if the DTD is inserted into the XML_DTD_REF table. If not, the XML extender inserts the DTD into the XML_DTD_REF and gets the new DTDid. Otherwise, the DTDid is retrieved and assigned to the XML object as its attribute.

Among the storing functions used within the XML extender are:

a) xmlFromFile—xmlFromFile takes the storage type and the name of a file containing the XML document and returns a DB2XML data type. The syntax of this function is

```
xmlFromFile (stType,    int,
             fileName   varchar (256))
``` and the return type is DB2XML.

b) xmlFromBuff—xmlFromBuff is used for storing short XML documents residing in the memory. It takes the storage type, a buffer containing the XML document, the length of the buffer, and an optional fileName, if the content needs to be stored in a file, and returns a DB2XML data type. The syntax is

```
xmlFromBuff  (stType,   int,
              buffer    varchar (4000)
              length    int,
              fileName  varchar (256))
``` and the return type is DB2XML. The length of buffer is limited to 4000 by the DB2® database. Therefore, for long XML documents, use of xmlFromFile( ) or xmlFromCLOB( ) is recommended.

c) xmlFromCLOB—xmlFromCLOB is used for storing long XML documents residing in the memory. It takes the storage type, a CLOB buffer containing the XML document, and an optional fileName, if the content needs to be stored in a file, and returns a DB2XML data type. The syntax is

| xmlFromCLOB | (stType, | int, |
| | clobdata | clob, |
| | fileName | varchar (256)) | and the return type is DB2XML.

Retrieval functions are used to retrieve XML documents from the DB2® database. The XML extender provides several retrieval functions, such as:

a) xmlToFile—xmlToFile takes a DB2XML object and returns a fileName, which contains an XML document. If the XML data is stored inside DB2® in CLOB, then a temporary file name in directory "templobs" under XML extender's home directory is returned. If the XML data is stored externally to DB2® in a file, then that file name is returned. The syntax is

| xmlToFile | (xmlobj | DB2XML) | and the return type is varchar (256).

b) xmlToBuff—xmlToBuff takes a DB2XML object and returns a Buffer which contains an XML document. If a user needs to get data as the type of CLOB, then the user can use DB2XML..content if data is stored as CLOB in DB2® or use xmlFileToCLOB(DB2XML..fileName) if data is stored in an external file. The syntax is

| xmlToBuff | (xmlobj | DB2XML) | and the return type is

| varchar (4000) | /* 4k is the max length of varchar */ |

The type of return buffer is varchar. The length of buffer is limited to 4000 by the DB2® database. Therefore, this UDF is useful for short XML documents. For long XML documents, use of data type CLOB for memory access is needed. Then, the user can use ADT observer DB2XML..content if data is stored as CLOB in DB2®, or use xmlFileToCLOB(DB2XML..fileName) if data is stored in an external file.

Search functions are used to search XML documents in a structural manner. The XML extender provides the following search functions:

a) xmlContains—xmlContains takes a DB2XML object, a search path and a search content and returns an integer. If the search content is found in the search path, the function returns a 1, otherwise, it returns a 0. The syntax is

| xmlContains | (xmlobj | DB2XML, |
| | path | varchar (256) |
| | content | varchar (256)) | and the return type is Integer.

b) xmlNoMatches—xmlNoMatches takes a DB2XML object, a search path and a search content and returns an integer as number of matches found in the document. The syntax is

| xmlNoMatches | (xmlobj | DB2XML, |
| | path | varchar (256) |
| | content | varchar (256)) | and the return type is integer.

Figure 3:
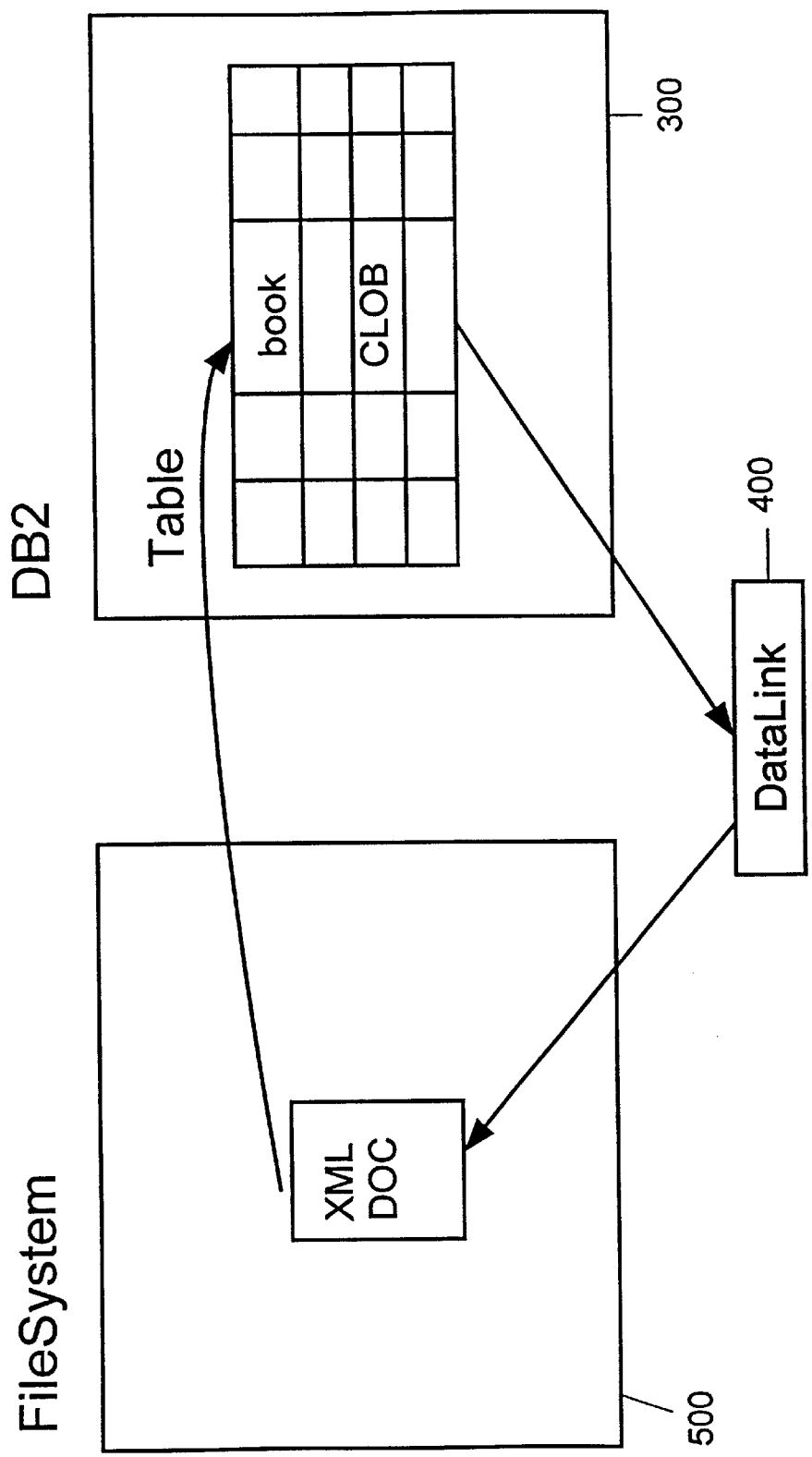
FIG. 3 is a block diagram showing an example of a relationship between DB2® and an external file system, both storing XML documents in accordance with the present invention.

Transformation functions are used to transfer data between the internal CLOB stored within DB2® and the external files. As illustrated in FIG. 3, data can travel from DB2® 300 to the external files 500 via data link 400 and direct from the external files 500 to DB2® 300.

a) xmlFileToCLOB—xmlFileToCLOB takes an input file name and returns a DB2® CLOB having the file data. The syntax is

| xmlFileToCLOB | (fileName | varchar (256)) | and the return type is CLOB.

b) xmlCLOBToFile—xmlCLOBToFile takes a DB2® CLOB and a directory name and returns a file under the input directory which has the CLOB data. The syntax is

| xmlCLOBToFile | (data | CLOB, |
| | directory | varchar (256)) | and the return type is varchar.

Utility functions are used to help an application when the constructor DB2XML is called. The XML extender provides the following utility functions a) xmlFileSize—xmlFileSize takes the file name and returns the size of the file. The syntax is

| xmlFileSize | (fileName | varchar (256)) | and the return type is integer.

When the DB2® database is XML enabled, DTD reference tables are also internally created.

3. Creation of the DTD ReferenceTable (XML_DTD_REF table)

The XML_DTD_REF is a DTD reference table, which stores all of the information about DTDs that can be used by XML documents. The XML_DTD_REF table also serves the role of the DTD repository. Each row of the DTD table represents a DTD with additional metadata information. A user can insert additional rows to add other DTDs. The DTDs can be stored either externally as files or internally as CLOBs, specifying the stType storage type. With this reference table, no duplication information needs to be stored in normal tables with XML columns. The XML_DTD_REF table is created with the following create table statement:

```
create table xml_dtd_ref (
    id          int             not null,
    author      varchar (256),
    stType      int,            not null,
    URL         varchar (256),
    content     clob (10k),
    colCount    int,
    info1       varchar (2000),
    info2       varchar (2000),
    constraint  xml_ref_k       primary key (id));
```

4. Creation of Internal Registration Table

Another internal action executed when the database is XML enabled is the creation of internal tables, such as an XML_COLUMNS table. The XML_COLUMNS table is used to store common information for each XML enabled column. The table is created with the following statement.

```
create table xml_columns (
    fTableSchema    varchar (8)     not null,
    fTableName      varchar (18)    not null,
    fColName        varchar (18)    not null,
    dtdid           int             not null,
    indexType       int             not null,
    idxSchema       varchar (8),
    idxName         varchar (18),
    constraint xmlcol_pk primary key (
        fTableSchema, fTableName, fColName),
    constraint xmlcol_fk foreign key (dtdid)
        references xml_dtd_ref (id));
```

This table stores meta data regarding each XML column in the database which has been enabled by the xmladm enable_col option to be described later.

Finally, enablement of the DB2® database triggers a grant of privileges to the public.

5. Granting of table privileges to public

Any user of the database may query the XML_DTD_REF table and the XML_COLUMNS table, but only certain users can update these tables. The enable_db option of xmladm will also handle the privileges.

B. Creation of an XML Table

An XML table is a table that includes one or more XML columns. An XML column is a column created with the DB2 XML data type or its subtype. In order to create such a table, a CREATE TABLE statement is provided. The CREATE TABLE statement must include an XML column in its column clause. As an example, consider a bookkeeping system of the first published book of each employee in a publishing company.

Employees' IDs, names, years of the service time and the first books are stored in the first_book table. The following CREATE TABLE statement will be used:

```
CREATE TABLE first_book (
    ( id        char(6),
      name      varchar (20),
      service   int,
      book      db2xml);
```

C. Enablement of an XML Column

Once created, the XML column must be enabled. The column can be enabled with an enable_col option of the xmladm administration tool. The syntax of the option is xmladm enable_col dbName tbName column (DTDid)

where the dbName is the name of the XML enabled database, the tbName is the table name in which the XML column resides, the column is the name of XML column, the DTDid is the optional key in the xml_dtd_ref table.

An example of the syntax for enabling the XML column of the previously created first_book table in database mydb is:

C: \xml> xmladm enable_col mydb first_book book

Connecting to the Database -- Connect to Database Successful.

Calling Enable Column, Please wait -- Enable Column Successful.

C: \xml>

The enable_col option of the xmladm administration tool triggers the following actions:

a) It inserts a row into the XML_COLUMNS table;

b) It updates the XML_DTD_REF table to increase the column counter if DTDid is specified. The DTDid here is provided to specify that this XML column must be tied with a specific DTD. In this case, the same DTDid will be assigned to every DB2XML data for every row. An index can also be bound to the DTD.

D. Enablement of an XML Index

Since XML columns contain XML documents, applications need to perform structural queries on these columns. Therefore, an index strategy that will quickly identify the search items is needed.

The XML extender does key transformation on top of the B+ tree index structures provided by the DB2® database. The key transformation hides all details from the application and creates the index for structural search.

Based on the nature of XML document, the XML extender provides three indexing mechanisms:

1. General Indexing Mechanism

In a general indexing mechanism, the XML column is not bound to one DTD. The XML document stored in the XML column, can be well-formed (without a DTD) or valid (including DTD). The index will be created to include all structures of the XML document. Each time a document is stored, the index tree structure may be updated.

2. DTD Bounded Indexing Mechanism

In a DTD bounded indexing mechanism, the XML column is mapped to one DTD. The DTD must be in the XML_DTD_REF table and application should get the DTDid before the index is created. Therefore, prior to indexing, the XML extender must:

a) Parse the DTD and generate its internal tree structure, and b) Store DTD data into the XML_DTD_REF table.

Then, the XML extender can create the index using the create_index option of the xmladm administration tool. In this approach, every time an XML document instance is stored, the index structure will not change.

3. User Defined Indexing Mechanism

In this alternative, the user may define a set of elements and attributes needed to be indexed. This approach may be restrictive but provides better performance.

The xmladm command for enabling the index is the enable_index option, having the following syntax:

```
xmladm enable_index dbName tbName column type
    [<DTDid> <path list>]
```
where
the dbName is the name of the XML enabled database,
the tbName is the table name in which the XML column resides,
the column is the name of the XML column,
the type is the indexing type, which can be a G for general indexing, a D for DTD bounded indexing, or a U for user defined indexing,
the DTDid is the key in the XML_DTD_REF table, and
the path list is the list of the structure path.

The DTDid is needed if the type='D' and is otherwise not needed. If the DTDid is specified, then the enable_col option must have the same DTDid specified to the same column. The path list is needed if the type='U' and is otherwise not needed.

The index enabling of the previously created book column in table first_book of database mydb is:

C: \xml> xmladm enable_index mydb first_book book D 1

Connecting to the Database -- Connect to Database Successful.

Calling Enable Index, Please wait -- Enable Index Successful.

C: \xml>

This command will create the index of the book column with the DTD bounded indexing mechanism and use DTD specified in the XML_DTD_REF table with reference id '1'.

Structure Indexes for the XML Extender

It is known in the art that a structure query consists of two parts: a path and a content. The content part of the structure query specifies the terms (with optional AND, OR, and other operators) that the user is searching for. The path part, also called the structure part, is a sequence of document elements specifying the regions to be searched for content matches. The content of a document matching the structure query must reside in the specified regions; for example, the query to find all books that contain 'XML' and 'HTML' terms in the same chapter, "/book/chapter contains 'XML' and 'HTML'", has the path (structure) part "/book/chapter" and the content part "'XML' and 'HTML'". The query defines a containment relationship, i.e. a connection between the terms of the content part and the path of the structure part using the "contains" function. In general, the path part may also specify attribute name/value pairs associated with an element in the path; for example, the query "/book[@on_sale="80%"]/title contains 'XML'" is asking for XML books that are at 80% discount. Furthermore, a wildcard '*' may be used to denote a sequence of zero or more tag names.

Figure 8:
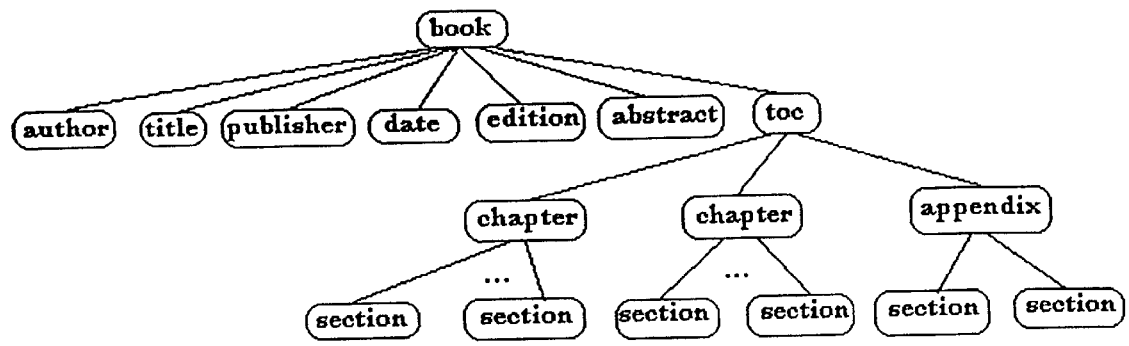
FIG. 8 is an exemplary structure of an XML document for use in accordance with the present invention.

The XML document presented above has its document structure tree illustrated in FIG. 8. Any attributes and contents have been omitted from the representation of the document structure tree and only the nodes have been shown in FIG. 8.

Figure 9:
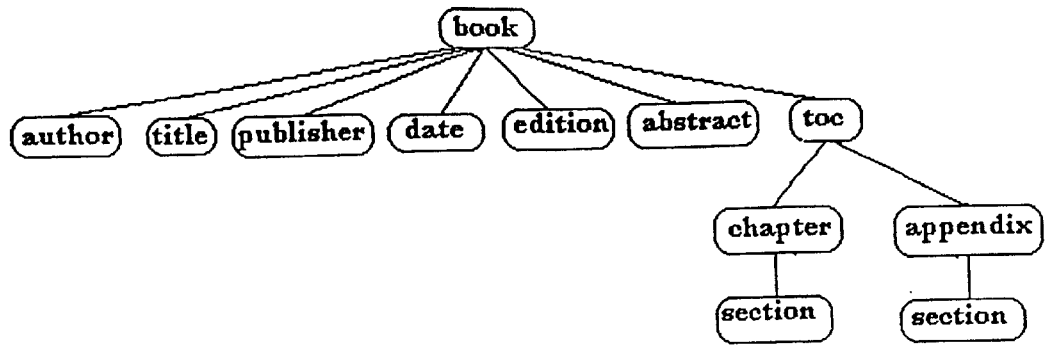
FIG. 9 is an exemplary structure index of the XML document structure of FIG. 8 for use in accordance with the present invention.
Figure 10:
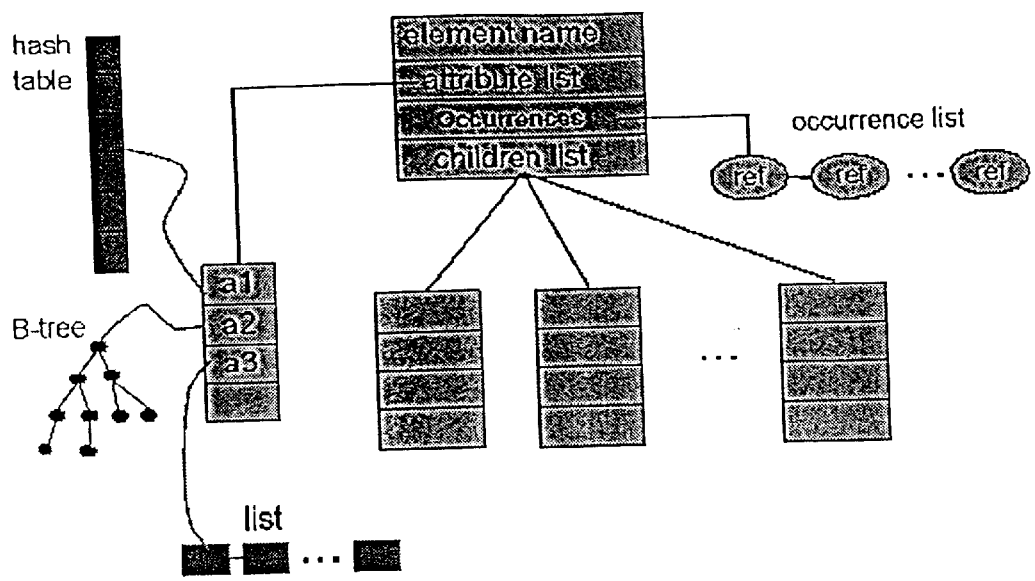
FIG. 10 is a data structure residing at each index node in the exemplary structure index of FIG. 9.

If the XML documents conform to a single DTD, all possible document structures may be known in advance, and the user may specify which regions of the documents need to be indexed. A structure index for the XML document, merging nodes of the same path, e.g. /book/toc/chapter, is illustrated in FIG. 9, but it is to be understood that many other index alternatives may be created using the same XML document. Each node in the structure index corresponding to a path p is associated with a list of occurrences of the path p and with a list of attributes. FIG. 10 describes the data structure at each node in the structure index, wherein the data structure includes the list of occurrences and the list of attributes. As illustrated in FIG. 10, different structures may be used for indexing different attributes of the XML document. The DB2® UDB version 6 only supports B+ tree index structures. However, it is to be understood that other structures, such as a hash table, also shown in FIG. 10, may be used for indexing purposes.

In general, a structure search refers to the searching for the path part, while a content search refers to the searching for the content part. For content searches, the index used in most search engines is based on variations of inverted files, wherein each keyword is mapped to the list of document occurrences:

contentIndex(keyword) --> (DocId, Pos)* and where Pos represents the positioning information of an occurrence of the keyword in a document DocId. Correspondingly, for structure searches, a structure index maps a path to a list of occurrences:

structureIndex(path) --> (DocId, Pos)* where Pos similarly describes the positioning information of an occurrence of the path in a document DocId. The positioning information plays a significant role in the integration of the structure index with the content index. The positioning information should enable the user to determine the containment relationship. For example, if offset is used for positioning information in XML documents, and an occurrence of /book/title is (D1, 150–168), then the path occurs in document D1 at offset 150–168. In addition, if the content index shows that one occurrence of the word 'XML' is (D1, 155–157), then the result is that document D1 satisfies the query "/book/title contains 'XML'".

However, in XML documents, offset information may not always be useful, because entities may affect the offset information. More particularly, in the XML environment, an entity is declared by <!ENTITY name text>, where name is the entity name, and text represents the definition of the entity. Once the entity is defined, it can be referenced by using &entity_name, which in fact will be replaced by the entity text within the document. For example, assuming that <!ENTITY OutofStock "Out of Stock. Will fill in 3 weeks."> is a declaration of an entity and <book>

```
<availability>  &OutofStock  </availability>
...
</book>
``` is an XML document, the &OutofStock reference will be equivalent to the "Out of Stock. Will fill in 3 weeks." text. If the user wants to query whether "/book/availability contains 'Stock'", several problems associated with offset may be encountered. First, in the <book> document, there may be no offset information for the "Out of Stock. Will fill in 3 weeks." text, because the text can be located anywhere within the document, or may reside in another document. At the same time, if multiple references to &OutofStock are present within the document, even assuming that offset information exists for words in the "Out of Stock. Will fill in 3 weeks." text, the offset cannot be used for positioning information because it cannot have multiple values for the same words.

Figure 11:
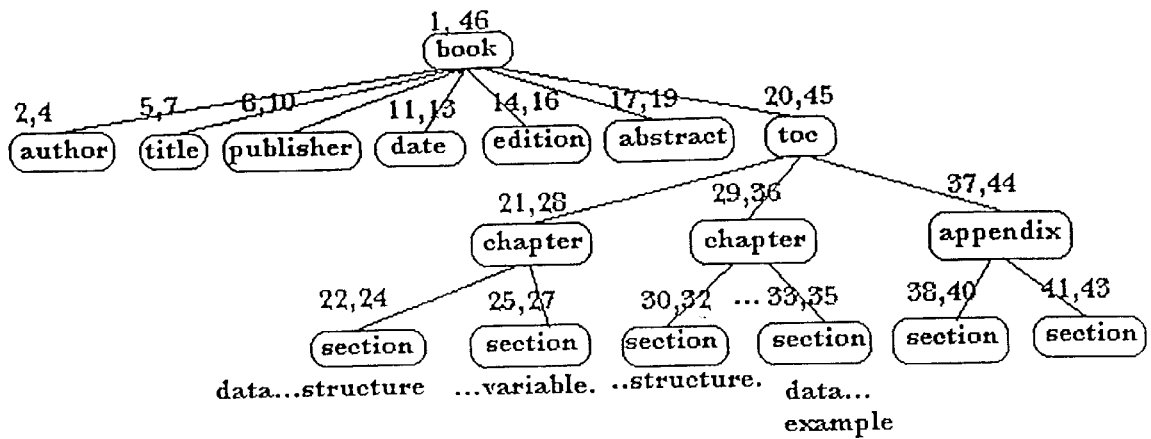
FIG. 11 is an illustration of the tag counting system in accordance with the present invention, applied to the XML document structure of FIG. 8.
Figure 12:
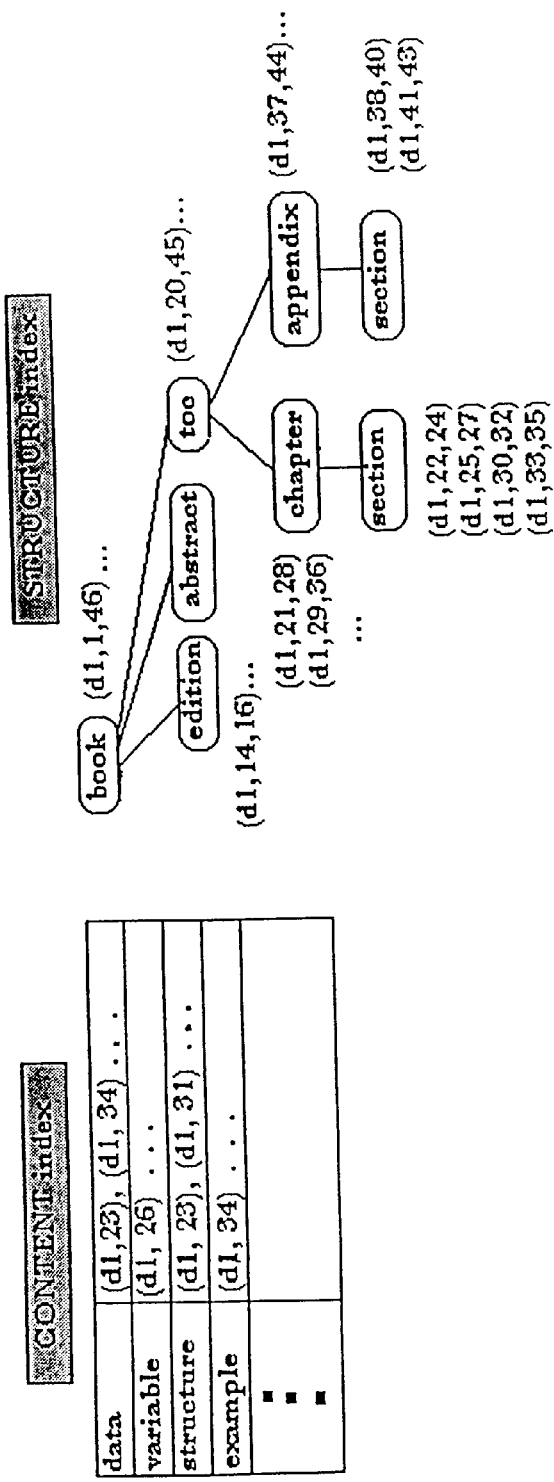
FIG. 12 is a representation of the occurrence lists in the content index and the structure index in accordance with the present invention.

Therefore, a novel tag counting system is introduced for producing more useful positioning information. When parsing an XML document, a counter for the number of existent tags is introduced and maintained. For each element node in the document structure tree, a start count (when first encountering <element>) and an end count (when first detecting </element>) are recorded. Each pure text content (i.e., having no nested tags) is counted as one, so that the terms it contains have the same number and are not individually counted. The content count should be entered in the content index as a part of the positioning information. For an element containing mixed nested elements and pure-text content, each piece of pure text content is separately counted. The tag counting system is illustrated in FIG. 11 and assumes that pure text content occurs only at the leaf nodes of the document structure. The occurrence lists in the content index and the structure index of the XML document are shown in FIG. 12.

The resulting positioning information in the structure index and the content index makes integration or "indexanding" of the two indexes possible. Referring to FIGS. 11 and 12, and given a query "/book/toc/chapter contains 'data' and 'variable'", the structure index finds that the occurrences of "/book/toc/chapter" are {(d1,21,28), (d1,29,36), . . . }, while the content index finds that the occurrences of 'data' are {(d1,23), (d1, 34), . . . } and the occurrences of 'variable' are {(d1, 26), . . . ). It is very easy to see that the (d1,21,28) occurrence contains both terms, as 23 and 26 are in the 21–28 range. Therefore, integration of the structure index and the content index is achieved by containment relationship of the positioning information in occurrence lists.

Figure 14B:
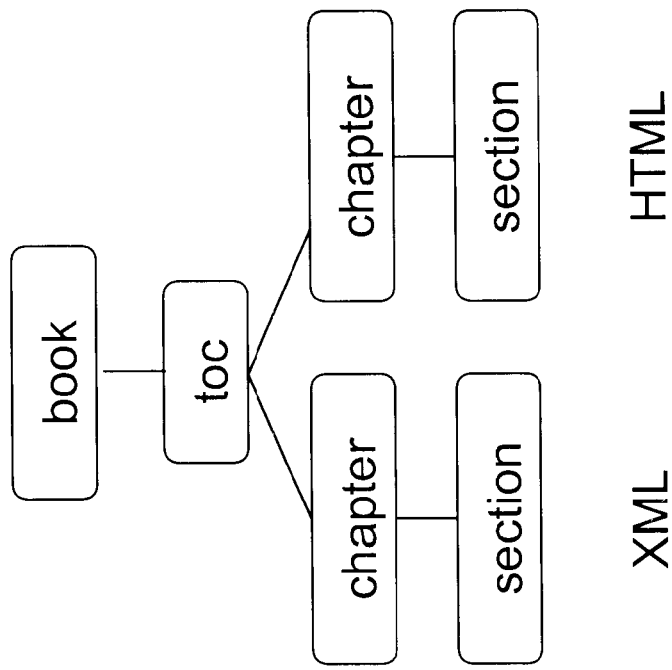
FIGS. 14A and 14B are exemplary diagrams for explaining the structured query approach of the present invention.
Figure 14A:
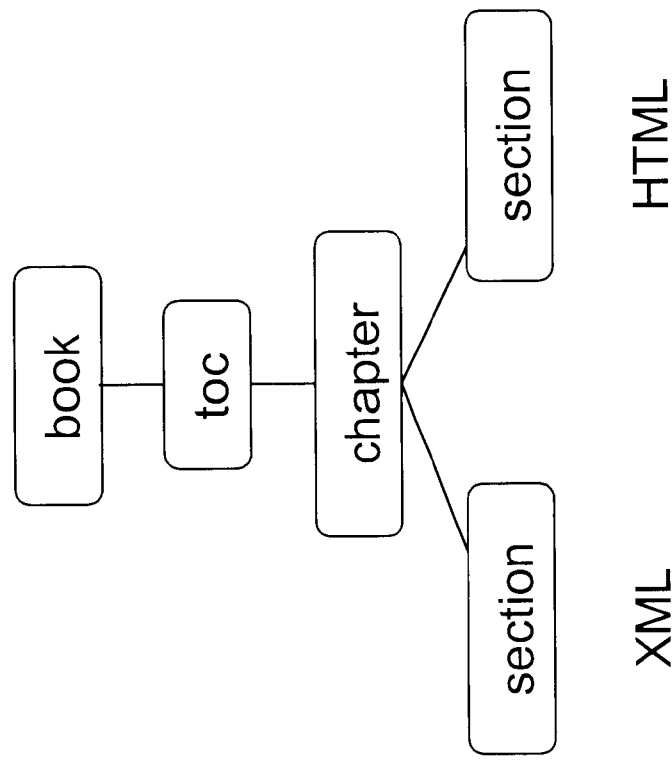

The tag counting system described above also helps the user conduct proximity searches on XML documents. A proximity search usually imposes a restriction on occurrences of certain terms to have a separation of no more than a given number of words apart. Other proximity conditions include the requirement that a certain term precede another or that several terms appear in the same paragraph. In the example query presented above, "/book/chapter contains 'XML' and 'HTML'", the challenge is to find all books that contain 'XML' and 'HTML' terms in the same chapter. An index that supports proximity searches will distinguish the two documents illustrated in FIGS. 14A and 14B and return the document depicted in FIG. 14A as a correct result, but not the document depicted in FIG. 14B.

The following code describes the search algorithm for a structure query:

```
//return a list of occurrences of 'path' that contains 'content'
//content is a list of words connected by AND or OR in an expression
tree;
structureSearch(path, content) {
    S = structureIndex(path);  //occurrence list of path
    switch  (content->type) {
      case WORD:
        L = contentIndex(content->word); //the occurrence list of word
        return includes(S, L);
      case AND:
        R1 = structureSearch(path, content->operand1);
        R2 = structureSearch(path, content->operand2);
        return intersect(R1,R2);
      case OR:
        R1 = structureSearch (path, content->operand1);
        R2 = structureSearch (path, content->operand2);
        return union(R1,R2);
    }
}
//returns a subset of S, which contains some word in L
includes(S, L) {
    result=empty;
    for (each e in S)
      for (each f in L)
```

```
        if (within (f.position, e.position))
          (result.add(e); break;)
    return result;
}
```

The function within(pos1, pos2) returns TRUE if pos1.DocId=pos2.DocId and pos1.start<pos2<pos1.end. The function includes(S, L) is used to filter S against L. Alternatively, a function includes(L, S) may also be used to filter L against S.

It is to be understood that the novel tag counting system also applies to XML documents having different or no DTDs. If the XML documents have different DTDs, and all the different DTDs are known at the time the index is created, then the previous procedure applies and all possible structure paths may be calculated in advance. If the DTDs cannot be known in advance (e.g., newly inserted documents bring in new DTDs), or if the XML documents have no DTDs at all, then the set of all possible paths changes over time, and such information should be consistently stored in proper format. If the set of possible paths is maintained in a tree-structured index, such as the one illustrated in FIG. 9, then the tree structure is not fixed. As a result, new nodes may be created when a new XML document is inserted. If the set of possible paths is encoded as keywords or part of keys, then this encoding or mapping needs to accommodate new paths.

Figure 13:
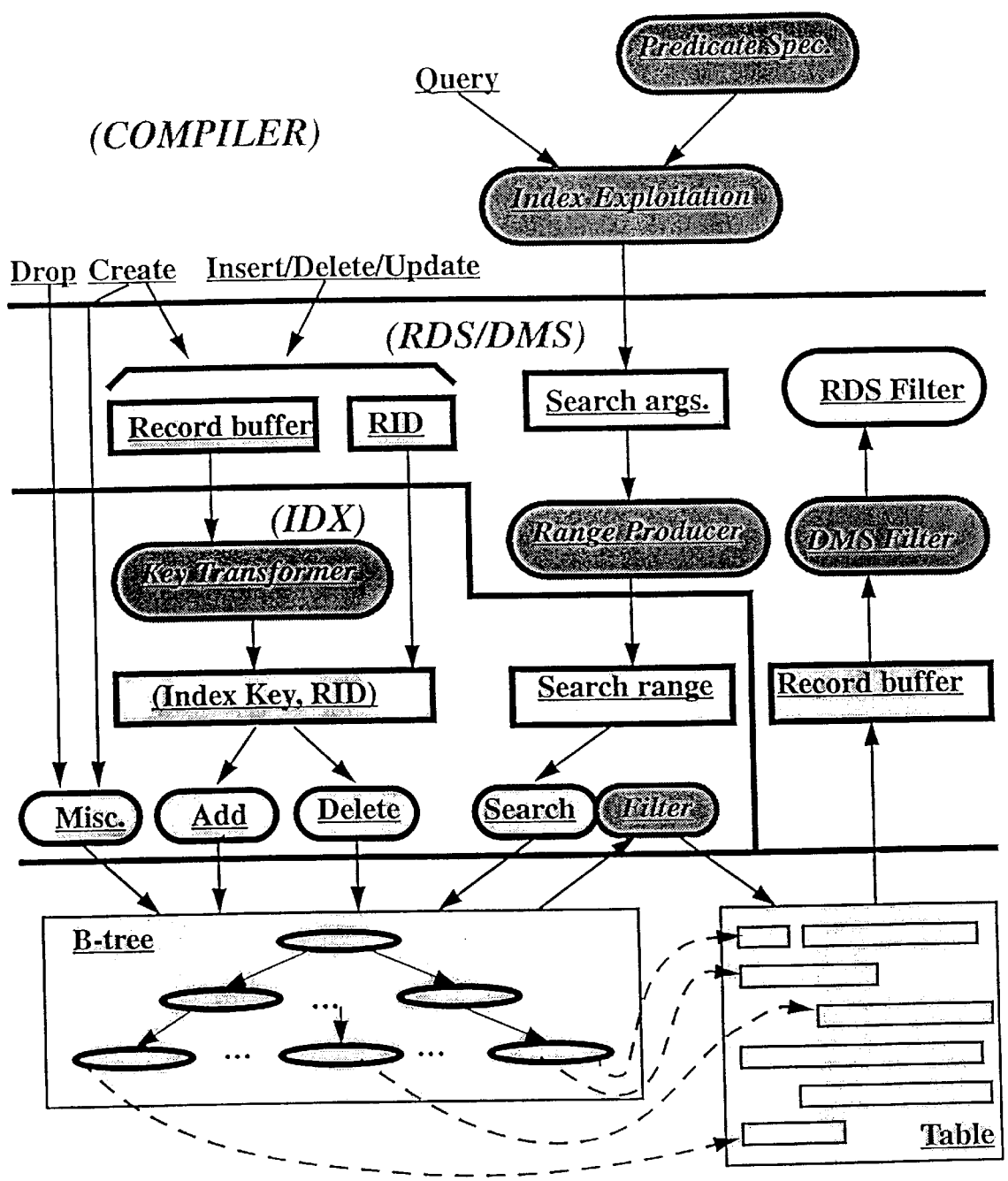
FIG. 13 is an exemplary architecture for use in accordance with the present invention, fully integrating spatial data into relational databases.

As described above, structure indexes may be implemented inside a DB2® database using its B+ tree support and index extensions implemented within the IBM® DB2® Spatial Extender, created to support spatial data. Currently, B+ trees are the only index structures supported by the DB2® UDB version 6. FIG. 13 illustrates an architecture that fully integrates spatial data into relational databases. This architecture is known in the art and has been implemented in the IBM® DB2® Spatial Extender. When performing insert/update/delete functions, the B+ tree index manager concatenates the set of column values, defined by the CREATE INDEX statement, to form a key to the index, and to store/delete the record ID (RID) into/from the index. Given a search request specified by a pair of start/stop keys, the index manager browses down the B+ tree, looking for keys in the given range, and retrieves the RIDs. The DB2® Spatial Extender allows UDFs to be invoked by the B+ tree index manager. The four modules in which UDFs can be invoked to apply application specific operations are a key transformer, a range producer, a filter, and a DMS filter.

The UDF in the key transformer is the only one applied at insert/update/delete time. Given a record, a UDF for the key transformer module, such as a table function, can be invoked to generate a set of keys to be used by the index manager for index maintenance. Multiple entries for a single record can exist in the index. The UDF in the range producer is applied at query time. Given a user search predicate, a UDF for the range producer module, such as a table function, can be invoked to generate a set of start/stop key pairs for searching in the B+ tree index. A UDF for the filter module is also applied at query time. Such a boolean filter UDF is invoked right after a RID is retrieved from the index. A common use of this UDF is to remove duplicates, because multiple entries may exist for a RID. A UDF for the DMS filter module is applied at query time. Such a boolean filter UDF is invoked, after the RID is used, to retrieve the data record and before the original predicate is applied.

The mapping of the structure index is structureIndex (path)-->(DocId, Pos)*. If each document stored in the database is logically a different document, even though it refers to the same physical document (there is no dependency between records due to document sharing), then RIDs can be used in the mapping of the structure index instead of the DocIds. The following steps transform the structure index into B+ tree style index:

```
    path -->(DocId, Pos)*
=> path x DocId x Pos        (flatten out the function)
=> path x Pos --> DocId*     (rearrange and make a function)
=> path x Pos --> RID*       (replace DocId with RID)
```

Thus, the mapping of the B+ tree index derived from the structure index is structureIndex(path, Pos) -->RID*. In order to search the paths using this index, the path needs to be a prefix of the index key. Several UDFs may be defined and then invoked by the index manager during a search request in the four areas detailed above. A key transformer UDF takes a document (or a document file name), parses it, and returns a set of (path, Pos), each of which is an occurrence of a path to be indexed. A range producer UDF takes the path and generates a single key whose prefix is the path. A filter UDF gets the content matches from the content index and performs containment check for each (DocId, Pos) obtained from the structure index at fetch time.

Creation of an Index for Structured Documents with Rich Data Types

Adding new data types to XML documents and associating these data types with XML elements and attributes provides a tool for users to ask range queries, rather than just keyword queries. In the preferred embodiment of the present invention, a method is described that uses already created B+ tree index structures implemented in RDBMS to support new indexes for structured documents with rich data types. A structured document with rich data types can handle most of the SQL data types, for example integer, real, decimal, date, time. This method presents a few obvious advantages. First, no new index structures and index managers need to be created and the existing robust and matured RDBMS indices can fulfill the requirements of fast query performance. Second, using the existing RDBMS B+ tree index support structures allows users to create indexes of all SQL data types that are already in place, such as integer, real, decimal, date, time. Third, this method does not require any extra columns or extra tables for creating and supporting the indexes. Fourth, this method allows the existing powerful SQL engine to automatically exploit the B+ tree index structures.

Figure 5:
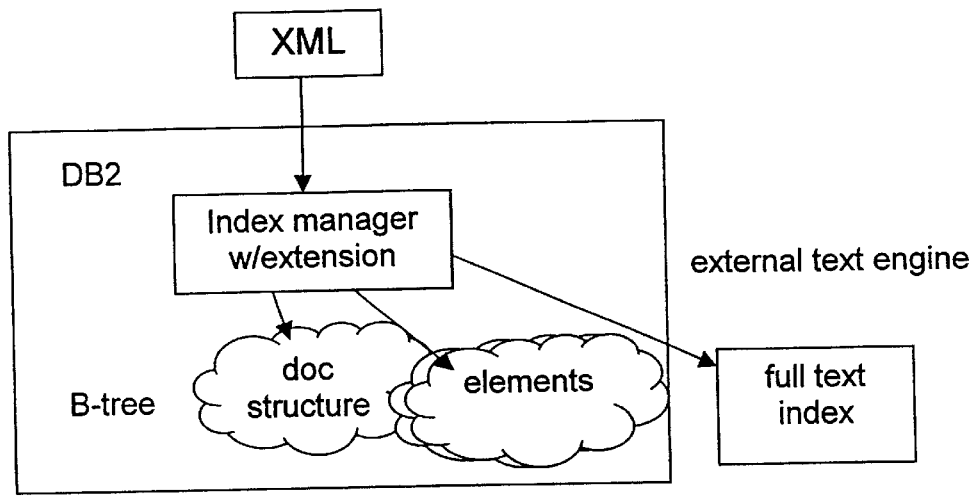
FIG. 5 is a block diagram showing the structure needed to create an index for structured documents with rich data types in accordance with the present invention.

As illustrated in FIG. 5, an XML document is stored in the DB2® database and creates an entry directly into an index manager and further into the existing B+ tree of the database. Subsequently, the user can create multiple indexes on columns, using UDFs and the statement:

CREATE INDEX idx1 ON t(cl, . . . , ck) USING (udfName(cl, . . . , ck));

where idx1 is the name of the newly created index, cl . . . ck represent the XML columns, and udfName is the name of the selected function.

Figure 6:
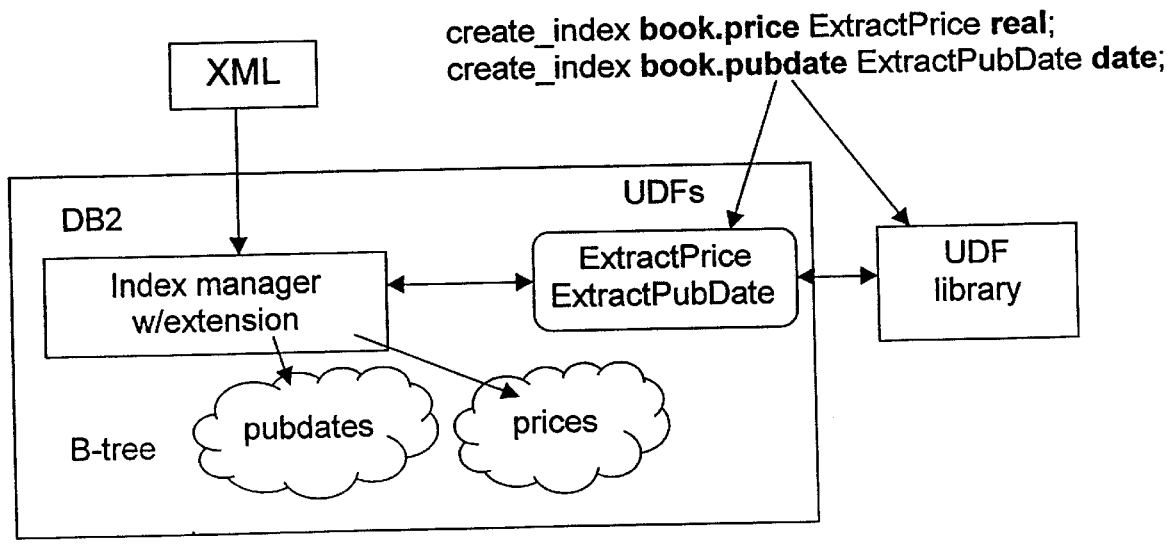
FIG. 6 is a block diagram showing an example of the method of creating an index for structured documents with rich data types in accordance with the present invention.

An example of the implementation of this statement is illustrated in FIG. 6. As shown in FIG. 6, the assumption is that xmldoc is the column that stored the XML document (either as a CLOB or as a file name), and that the XML document has the usual <book> schema. Also, let ExtractPrice and ExtractPubDate be the UDFs to extract, respectively, the content of /book/price (of data type 'real') and the content of /book/pubdate (of data type 'date'). As a result, using the above expression, the user creates an index idx1 on /book/price and another index idx2 on /book/pubdate:

CREATE INDEX idx 1 ON t(xmldoc) USING (ExtractPrice(xmldoc));
CREATE INDEX idx2 ON t(xmldoc) USING (ExtractPubDate(xmldoc)).

Both indexes may be created on the same table column, in this case xmldoc, or may be created on different columns. Once the indexes have been created, the user may input a query such as:

SELECT docid from t where ExtractPrice(xmldoc) > 100.0 utilizing the index idx1 to evaluate the predicate without scanning the XML document source. Having this powerful SQL support, the user can also input more complicated queries on XML elements, such as:

SELECT count(*) from t where ExtractPrice(xmldoc) > 100.0;

and

SELECT t1.docid, t2.docid from magazine t1, book t2
WHERE ExtractAuthor(t1.xmldoc)=ExtractAuthor (t2.xmldoc).

E. Insertion of Data into the XML Column

The DB2XML ADT 142 contains several data fields, so an XML document cannot be entered directly into an XML column. Instead, the XML documents must be loaded using the functions provided by the XML extender and detailed above. The most recommended function to be used for insertion of data into the XML column is xmlFromFile, which takes input parameters of file name and storage type. The storage type specifies whether you want to store XML document as external file or internal CLOB.

In the example below, a record is inserted into the first_book table. The function xmlFromFile transforms the file into content of DB2XML.

```
*include "xml.h"
EXEC SQL BEGIN DECLARE SECTION;
    int storage_type;
EXEC SQL END DECLARE SECTION;
storage_type = XML_CLOB;
EXEC SQL INSERT INTO first_book VALUES ('1234',
            'Sriram Srinivasan'
            5,
            xmlFromFile (:storage_type,
                'e:\xml\book.xml'))
``` where the storage type of XML_CLOB will specify to store the data of 'e:\xml\book.xml' into the first_book table as CLOB.

F. Querying of an XML Table

The XML table is ready to use when the XML columns are enabled. However, if the indexes have already been constructed, the query process will be faster. The indexing is not required by the search but is recommended for better performance.

Direct retrieval of the XML columns requires the XML data to be converted into a file or a buffer. In the preferred embodiment of the invention, the query simply returns the file name. The function xmlToFile returns the original file name if the XML document is stored externally, or returns a temp file with the CLOB data retrieved from DB2® if the XML document is stored as CLOB in DB2®. To support the "select*from" statement, a function xml_to_prog( ) is also provided as the default transformation function.

In the example below, a small sqc program segment illustrates how an XML document is retrieved from the XML table. This example is based on the inserting example illustrated above.

```
EXEC SQL BEGIN DECLARE SECTION;
    char  buffer (1000);
EXEC SQL END DECLARE SECTION;
EXEC SQL CONNECT TO mydb
EXEC SQL DECLARE cl CURSOR FOR
    SELECT xmlToBuff (book) from first_book
    WHERE name = 'Sriram Srinivasan'
EXEC SQL OPEN cl;
do {
    EXEC SQL FETCH cl INTO :buffer;
    if (SQLCODE != 0) {
        break;
    }
    else {
        /* do whatever you need to do with the XML doc in buffer */
    }
}
EXEC SQL CLOSE cl;
EXEC SQL CONNECT RESET;
```

If the function is xmlToFile, then the XML document is put into a file, which can be operated on directly.

The Conditional Select Functionality

In order to obtain XML element contents and attribute values as search results, the XML extender provides a "conditional select" functionality, which will be described below in further detail.

The "conditional select" functionality is based on UDFs being applied to a projection in a select clause of a SQL statement in the DB2® environment. For example:

```
SELECT
db2xml.ExtractChars (book,'/book/title', '/book/author(@last-
    name="Bob"]')
    FROM book_tab
    WHERE db2xml.ExtractDouble(book, '/book/price') > 25.50
``` is such a statement, where the db2xml.ExtractChars( ) is an UDF applying the conditional select to XML elements. The above SQL statement returns a table of book titles, which also satisfies the other conditions, namely books with the author name being "Bob" and having their price greater than $25.50. First, the WHERE clause returns all XML documents having a book with price greater than $25.50. Then, the XML extender searches the narrowed pool of documents for the XML documents having the author's first name equal to "Bob."

Returning to the semantics of the "conditional select" SQL statement, the first parameter must be the column name of a user defined type of the XML extender. The second parameter is the XML path, which identifies what needs to be selected. The third parameter is the condition, which is a qualified path expression. In return, the "conditional select" functionality will gather a SQL table containing rows of selected element contents and/or attribute values of the XML documents.

The UDF of the "conditional select" functionality scans the XML documents for the content of DB2XML data, using the XML parser 160 illustrated in FIG. 2. If the conditions are satisfied, the particular element content or attribute value is returned with the search results. Working in conjunction with the WHERE clause provided by the db2xml.ExtractChars( ) function, which performs the role of filtering the search of XML documents, the "conditional select" functionality further narrows down the projection and returns the search results.

The DB2 XML extender provides a set of UDFs to work with the "conditional select" functionality. Each UDF corresponds to one popular SQL data type, as shown in the following table:

| Return Type | Table | Function |
|---|---|---|
| Integer | extractIntegers (xmlobj path | DB2XML varchar) |
| Double | ExtractDoubles (xmlobj path | DB2XML varchar) |
| varchar (2k) | ExtractChars (xmlobj path | DB2XML varchar) |
| CLOB | ExtractCLOBs (Xmlobj path. | DB2XML varchar) |
| date | extractDates (xmlobj path | DB2XML varchar) |
| time | extractTimes (xmlobj path | DB2XML varchar) |
| timestamp | ExtractTimestamps (xmlobj path | DB2XML varchar) |

G. Updating Values of an XML Column

Since the ADT DB2XML is composed of a set of attributes, updating the values of a DB2XML column data translates actually into updating attribute values of the DB2XML. In its preferred embodiment, the present invention provides two ways to update the column values.

1. Update attribute values individually

For example, if a user wants to change the storage type of an instance of the book table illustrated above from the external file to the internal CLOB, the following segment of sqc code illustrates the procedure.

```
#include "xml.h"    /* where stType is defined */
EXEC SQL BEGIN DECLARE SECTION;
    int  storage_type;
EXEC SQL END DECLARE SECTION;
EXEC SQL CONNECT TO mydb
storage_type = XML_CLOB;
UPDATE first_book set   book.stType = :storage_type
                book..fileName = NULL
                book..content=xmlFileToCLOB(book..fileName)
    WHERE name = "Sriram Srinivasan'
EXEC SQL CONNECT RESET;
```

2. Update column data as a whole

On the other hand, the XML extender also provides functions to allow updating of the entire DB2XML column data. The following segment of sqc code illustrates this procedure.

```
#include "xml.h"    /* where stType is defined */
EXEC SQL BEGIN DECLARE SECTION;
    int dtdid;
    int storage_type;
EXEC SQL END DECLARE SECTION;
EXEC SQL CONNECT TO mydb;
EXEC SELECT id into :dtdid from sml_dtd_ref
    WHERE URL = 'http://w3.stl.ibm.com/xml/book.dtd"
storage_type = XML_CLOB;
WITH fname(book..fileName) AS
    (SELECT book..fileName from first_book
        WHERE name = 'Sriram Sriivasan')
```

-continued

```
UPDATE first_book
    set book = xmlFrom File(:storage_type,
                            fname)
    WHERE name = 'Sriram Srinivasan'
EXEC SQL CONNECT RESET;
```

The two segments of sqc code include some key differences. The first alternative has better performance since it directly updates attribute values of DB2XML. The second one uses the same function call for inserting and thus needs to retrieve the fileName first, then pass it as the third parameter to the xmlFromFile. Therefore, there is a performance drawback. However, if the content of the XML document needs to be updated from another file, totally different from the original file, the file name can be specified as the third parameter to the xmlFromFile. In addition, the second alternative also shows how to get the DTDid from the XML_DTD_REF table, while the first one does not.

H. Searching the Stored XML Documents

The above sections have shown how to use XML extender as the document repository for storage and retrieval of XML documents. Another important feature of the XML extender is its structural search capability.

The XML extender provides SQL functions that enable a user to include structural subqueries in SQL queries. These functions are provided in addition to the functions normally available in SQL and are described above in great detail.

One of the structural search queries used with the present invention refers to finding the XML documents containing certain terms in the specified structural path. Using the example illustrated above, having the sample XML document "book.xml" inserted into the first_book table in database mydb, the xmlContains function searches for XML documents which are stored in the XML book column. The function returns integer 1 if the document satisfies the search argument and otherwise returns a 0.

```
EXEC SQL SELECT id, name
    FROM first_book
        WHERE xmlContains (book, '/book/title',
            'Programming')=1
```

This example returns the id and name of each record in the first_book table where the element 'book.title' contains the word 'Programming'. The xmlContains function can only be used in conjunction with a WHERE clause.

The xmlNoMatches function is used to determine the number of matches meeting the search criteria in each XML document. For example:

```
WITH TEMPTABLE (id, name, no_matches)
    AS (SELECTid, name, xmlNoMatches (book, '/book/title', 'Programming')
        From first_book )
    SELECT *
        FROM TEMPTABLE
            WHERE no_matches > 2
```

The xmlNoMatches function returns an integer value. The function can be used in both a SELECT clause and a WHERE clause.

Search arguments are used in the xmlContains and xmlNoMatches functions. For structural search purposes, the search arguments are separated into two parts. A path part, or so-called structure part is defined as:

path: : = element | path '/' element
element: :=tagName ('[' (@attributeName= attributeValue) +']' ) ?| '*' where tagName, attributeName and attribute Value are CDATA in XML terminology.

The path part is a sequence of document elements that specifies the regions within which the content part is searched against. The path may also specify attribute Name/Value pairs associated with an element in the path. For example, the path '/book/toc/chapter[@id='1']/section' is identifying the section within the chapter whose id is equal to '1'. The wildcard "*" may be used to denote a sequence of zero or more tag names.

A content part specifies the terms, with optional sequence, with "," or AND and OR operation, that the application is searching for. The content part is defined as:

Content: :=primaryList primaryList: :=primary | primaryList (OR|AND) primaryList primary: :=atom | '(' atomList ')' atomList: :=atom ',' atom atom: :=''' word ''' where word is #CDATA in XML terminology, "OR" and "AND" are Boolean operators "&" and "|".

Several examples of structural searches are listed below.

a) Searching for Several Terms

```
SELECT id, name, hTime
    FROM first_book
        WHERE xmlContains(book, '/book/toc/chapter',
            '("reference","students")')=1
```

In this example, all XML documents containing both 'reference' and 'student' in path 'book.toc.chapter' will satisfy the search criteria.

b) Searching with Wildcards

```
SELECT id, name, hTime
    FROM first_book
        WHERE xmlContains (book, '/book//section',
            '"reference"')=1
```

In this example, all XML documents having the word 'reference' in the path starting with 'book' and ending with 'section' will satisfy the search criteria.

c) Searching with Boolean Operation on Content

```
SELECT id, name, hTime
    FROM first_book
        WHERE xmlContains(book, '/book/toc',
            '"reference"|"student"')=1
```

In this example, all XML documents having either 'reference' or 'student' will satisfy the search criteria d) Searching with Path Constrained by Attribute Values

```
SELECT id, name, hTime
    FROM first_book
        WHERE xmlContains(book, '/book/toc/chapter[@id=
            '2'].section','"student"')=1
```

In this example, only XML documents having 'student' in the sections under chapter 2 will satisfy the search criteria.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize that many modifications may be made to this configuration without departing from the scope of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of creating at least one index in a database system, using an extender for said database system, said extender enabling a user to create said at least one index in said database system for execution of a structured query given by said user, said method comprising the steps of:
   receiving a structured document having at least one element, said at least one element including a start tag and an end tag defined by said user;
   parsing said structured document into said at least one element;
   assigning tag values in a predetermined order to each of said start tag and said end tag of said at least one element; and
   storing said tag values corresponding to each of said start tag and said end tag of said at least one element in a structured index in said database system.

2. The method according to claim 1, wherein said at least one element of said structured document further includes data between said start tag and said end tag of said at least one element.

3. The method according to claim 2, further comprising, subsequent to said assigning step, the steps of assigning further tag values in said predetermined order to said data and storing said tag values corresponding to said data in a content index in said database system.

4. The method according to claim 1, wherein in said assigning step, said tag values are numerical.

5. The method according to claim 3, wherein in said assigning step, said further tag values are numerical.

6. The method according to claim 3, wherein said structured query is executed on said structured index and said content index in said database system.

7. The method according to claim 1, wherein said parsing step further comprises parsing said structured document into a plurality of elements.

8. The method according to claim 7, further comprising, subsequent to said parsing step, the step of merging each of said plurality of elements having identical tags.

9. The method according to claim 1, wherein said at least one element of said structured document further comprises a plurality of corresponding names and values associated with said at least one element.

10. The method according to claim 3, further comprising, subsequent to the steps of storing said tag values corresponding to each of said start tag and said end tag and said further tag values corresponding to said data, the step of implementing said structured index and said content index in said database system using B+ tree index support structures implemented in said database system.

11. The method according to claim 1, wherein said structured document is written in Extensible Markup Language (XML).

12. An apparatus for creating at least one index in a database system, using an extender for said database system, said extender enabling a user to create said at least one index in said database system for execution of a structured query given by said user, said apparatus comprising:
   a computer having at least one data storage device connected thereto, wherein said at least one data storage device stores said extender and said database systems; and
   at least one computer program performed by said computer for:
      receiving a structured document having at least one element, said at least one element including a start tag and an end tag defined by said user;
      parsing said structured document into said at least one element;
      assigning tag values in a predetermined order to each of said start tag and said end tag of said at least one element; and
      storing said tag values corresponding to each of said start tag and said end tag of said at least one element in a structured index in said database system.

13. The apparatus according to claim 12, wherein said at least one element of said structured document further includes data between said start tag and said end tag of said at least one element.

14. The apparatus according to claim 13, wherein said at least one computer program, subsequent to assigning tag values, assigns further tag values in said predetermined order to said data and stores said tag values corresponding to said data in a content index in said database system.

15. The apparatus according to claim 12, wherein in said assigning step, said tag values are numerical.

16. The apparatus according to claim 14, wherein in said assigning step, said further tag values are numerical.

17. The apparatus according to claim 13, wherein said structured query is executed on said structured index and said content index in said database system.

18. The apparatus according to claim 12, wherein said at least one computer program, during said parsing, further parses said structured document into a plurality of elements.

19. The apparatus according to claim 18, wherein said at least one computer program, subsequent to parsing said structured document, further merges each of said plurality of elements having identical tags.

20. The apparatus according to claim 12, wherein said at least one element of said structured document further comprises a plurality of corresponding names and values associated with said at least one element.

21. The apparatus according to claim 14, wherein said at least one computer program, subsequent to storing said tag values corresponding to each of said start tag and said end tag and said further tag values corresponding to said data, further implements said structured index and said content index in said database system using B+ tree index support structures implemented in said database system.

22. The apparatus according to claim 12, wherein said structured document is written in Extensible Markup Language (XML).

23. An article of manufacture comprising a program storage medium readable by a computer and tangibly embodying at least one program of instructions executable by said computer to perform method steps for creating at least one index in a database system, using an extender for said database system, said extender enabling a user to create said at least one index in said database system for execution of a structured query given by said user, the method comprising the steps of:

receiving a structured document having at least one element, said at least one element including a start tag and an end tag defined by said user;

parsing said structured document into said at least one element;

assigning tag values in a predetermined order to each of said start tag and said end tag of said at least one element; and storing said tag values corresponding to each of said start tag and said end tag of said at least one element in a structured index in said database system.

24. The article of manufacture according to claim 23, wherein said at least one element of said structured document further includes data between said start tag and said end tag of said at least one element.

25. The article of manufacture according to claim 24, further comprising, subsequent to said assigning step, the steps of assigning further tag values in said predetermined order to said data and storing said tag values corresponding to said data in a content index in said database system.

26. The article of manufacture according to claim 23, wherein in said assigning step, said tag values are numerical.

27. The article of manufacture according to claim 25, wherein in said assigning step, said further tag values are numerical.

28. The article of manufacture according to claim 25, wherein said structured query is executed on said structured index and said content index in said database system.

29. The article of manufacture according to claim 23, wherein said parsing step further comprises parsing said structured document into a plurality of elements.

30. The article of manufacture according to claim 29, further comprising, subsequent to said parsing step, the step of merging each of said plurality of elements having identical tags.

31. The article of manufacture according to claim 23, wherein said at least one element of said structured document further comprises a plurality of corresponding names and values associated with said at least one element of said structured document.

32. The article of manufacture according to claim 25, further comprising, subsequent to the step of storing said tag values corresponding to each of said start tag and said end tag and said further tag values corresponding to said data, the step of implementing said structured index and said content index in said database system using B+ tree index support structures implemented in said database system.

33. The article of manufacture according to claim 23, wherein said structured document is written in Extensible Markup Language (XML).

* * * * *